US008300846B2

(12) United States Patent
Kim et al.

(10) Patent No.: US 8,300,846 B2

(45) Date of Patent: Oct. 30, 2012

(54) APPRATUS AND METHOD FOR PREVENTING NOISE

(75) Inventors: Kyu-hong Kim, Suwon-si (KR); Kwang-cheol Oh, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 329 days.

(21) Appl. No.: 12/612,857

(22) Filed: Nov. 5, 2009

(65) Prior Publication Data

US 2010/0119079 A1 May 13, 2010

(30) Foreign Application Priority Data

Nov. 13, 2008 (KR) ........................ 10-2008-0112734

(51) Int. Cl.

*H04B 15/00* (2006.01)
*G10K 11/16* (2006.01)
*H04R 1/40* (2006.01)

(52) U.S. Cl. ..................... 381/94.3; 381/94.1; 381/94.2; 381/71.1; 381/71.2; 381/71.8; 381/97

(58) Field of Classification Search ................. 381/94.1, 381/94.2, 94.3, 98, 71.1, 71.2, 71.8
See application file for complete search history.

(56) References Cited

U.S. PATENT DOCUMENTS

| | | | | |
|---|---|---|---|---|
| 5,610,991 | A | 3/1997 | Janse | |
| 5,740,256 | A | 4/1998 | Castello Da Costa et al. | |
| 6,032,114 | A | 2/2000 | Chan | |
| 6,647,367 | B2 | 11/2003 | McArthur et al. | |
| 2002/0048377 | A1 * | 4/2002 | Vaudrey et al. | 381/94.7 |
| 2005/0058301 | A1 * | 3/2005 | Brown | 381/94.2 |
| 2007/0033020 | A1 | 2/2007 | Francois et al. | |
| 2007/0154031 | A1 | 7/2007 | Avendano et al. | |
| 2008/0019548 | A1 | 1/2008 | Avendano | |
| 2008/0085012 | A1 * | 4/2008 | Matsuo | 381/94.3 |

FOREIGN PATENT DOCUMENTS

| | | |
|---|---|---|
| EP | 1926085 | 5/2008 |
| JP | 08-221093 | 8/1996 |
| KR | 1999-001295 | 1/1999 |

* cited by examiner

*Primary Examiner* — Devona Faulk
*Assistant Examiner* — George Monikang
(74) *Attorney, Agent, or Firm* — NSIP Law

(57) ABSTRACT

Provided are an apparatus and method for preventing noise. The apparatus estimates a noise signal from a signal transformed into a frequency domain, uses the estimated noise signal to estimate the amplitude of the frequency-domain signal according to a frequency band, and then calculates a phase difference according to a frequency band and eliminates or prevents noise from the amplitude-estimated frequency-domain signal based on the calculated phase difference according frequency band.

19 Claims, 4 Drawing Sheets

APPRATUS AND METHOD FOR PREVENTING NOISE

CROSS-REFERENCE TO RELATED APPLICATION(S)

This application claims the benefit under 35 U.S.C. §119 (a) of a Korean Patent Application No. 10-2008-112734, filed on Nov. 13, 2008, the disclosure of which is incorporated herein by reference in its entirety for all purposes.

BACKGROUND

1. Field

The following description relates to processing sound signal, and more particularly, to an apparatus and method for preventing noise.

2. Description of the Related Art

Background noise is an obstacle to having a clear voice communication using, for example, a communication terminal such as a mobile phone. One way to improve the clarity of voice communication in a noisy environment is to estimate the background noise components and extract only an actual voice signal.

Voice-based applications are increasingly being applied to various kinds of terminals, for example, camcorders, laptop computers, navigation devices, game machines, and the like, that may receive voice inputs or store voice data. Accordingly, such terminals may need to eliminate or prevent background noise and extract a high-quality voice signal.

While methods of estimating or eliminating/preventing background noise may been suggested, the conventional methods may not provide a desired noise filtering performance when, for example, statistical features of noise change over time or unpredictable sporadic noise occurs in an initial stage of ascertaining statistical features of noise.

SUMMARY

According to one general aspect, there is provided a noise preventing apparatus, including a noise power estimator to estimate a noise signal from a sound signal transformed into a frequency-domain signal, an amplitude estimator to estimate an amplitude of the frequency-domain signal according to a frequency band using the estimated noise signal, and a phase filter to calculate a phase difference according to a frequency band from the amplitude-estimated frequency-domain signal and eliminate or prevent noise based on the phase difference according to the frequency band.

The apparatus may further include a Fourier transformer to receive the sound signal from all or multiple directions and transform the sound signal into the frequency-domain signal, and an inverse Fourier transformer to transform the frequency-domain signal from which the noise has been eliminated or prevented by the phase filter into a time-domain signal.

The sound signal may be received through two adjacent microphones.

The phase filter may eliminate or prevent the noise by calculating a weight value based on the phase difference according to the frequency band and multiplying the amplitude-estimated frequency-domain signal by the weight value.

The weight value according to the frequency band may be determined depending on whether the phase difference is within a permissible phase difference range of target sound.

The permissible phase difference range of the target sound may be determined by the frequency band, the phase difference according to the frequency band, and a distance between adjacent microphones receiving the sound signal.

The amplitude estimator may estimate the amplitude of the frequency-domain signal according to the frequency band using a Wiener filter that uses a signal-to-noise ratio of the frequency-domain signal to the estimated noise signal.

The noise power estimator may estimate the noise by eliminating or preventing an input signal coming from a direction of a sound source of target sound to be detected from the frequency-domain signal and then compensating for a change in directional gain according to a frequency band of the frequency-domain signal from which the target sound is blocked.

The apparatus may further include a gain calibrator to equalize gains of adjacent microphones receiving the sound signal.

The apparatus may further include a divider to divide the frequency-domain signal into frequency bands reflecting frequency domain characteristics or auditory recognition characteristics, and apply the divided frequency-domain signals to the noise power estimator, the amplitude estimator, and the phase filter.

The frequency bands may be Mel-scale bands or Bark-scale bands.

According to another general aspect, there is provided a method for preventing noise, the method including receiving a sound signal and transforming the sound signal into a frequency-domain signal, estimating a noise signal from the frequency-domain signal, estimating an amplitude of the frequency-domain signal according to a frequency band using the estimated noise signal, calculating a phase difference according to a frequency band from the amplitude-estimated frequency-domain signal and eliminating or preventing noise based on the phase difference according to the frequency band, and transforming the frequency-domain signal from which the noise has been eliminated or prevented into a time-domain signal.

The receiving of the sound signal may include receiving the sound signal from all or multiple directions through two adjacent microphones.

The eliminating or preventing of the noise may include calculating a weight value based on the phase difference according to the frequency band, and multiplying the amplitude-estimated frequency-domain signal by the weight value.

The weight value according to the frequency band may be determined depending on whether the phase difference is within a permissible phase difference range of target sound, the permissible target sound phase difference range depending on the frequency band, the phase difference according to the frequency band, and a distance between adjacent microphones receiving the sound signal.

The estimating of the amplitude may include estimating the amplitude using a Wiener filter that uses a signal-to-noise ratio of the frequency-domain signal to the estimated noise signal.

The method may further include calibrating gains of adjacent microphones receiving the sound signal.

The method may further include dividing the frequency-domain signal into a plurality of frequency bands reflecting frequency domain characteristics or auditory recognition characteristics, and applying the divided frequency-domain signals to the estimating of the noise, the estimating of the amplitude, and the estimating of the noise.

Other features and aspects will be apparent from the following description, the drawings, and the claims.

Figure 1:
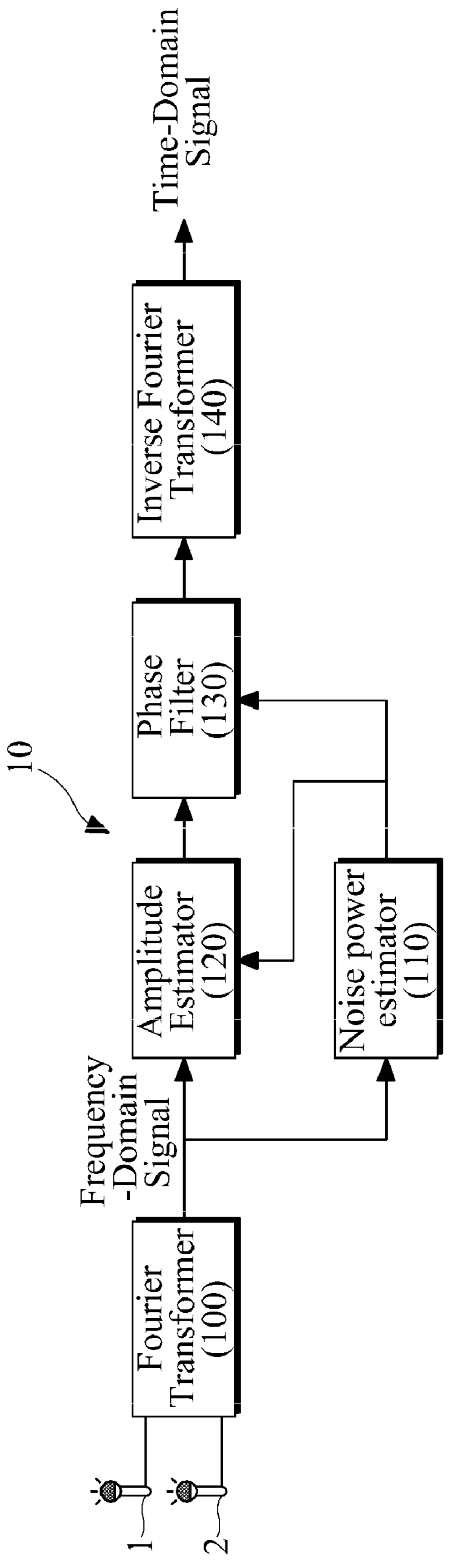
FIG. 1 is a block diagram of an exemplary noise preventing apparatus.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

FIG. 1 illustrates an exemplary noise preventing apparatus 10.

Referring to FIG. 1, the apparatus 10 includes a Fourier transformer 100, a noise power estimator 110, an amplitude estimator 120, a phase filter 130, and an inverse Fourier transformer 140.

The Fourier transformer 100 receives a sound signal from multiple directions and transforms a time-domain signal into a frequency-domain signal.

The noise power estimator 110 estimates a noise signal from the transformed frequency-domain signal.

The amplitude estimator 120 estimates the amplitude of target sound according to a frequency band from the estimated noise signal.

The phase filter 130 calculates a phase difference according to a frequency band from the amplitude-estimated frequency-domain signal, and eliminates or reduces noise based on the calculated phase difference according to a frequency band.

The inverse Fourier transformer 140 transforms the noise-eliminated ("noise-free") or noise-reduced frequency-domain signal into a time-domain signal.

For example, first and second microphones 1 and 2 include amplifiers and analog-to-digital converters, and produce electrical signals from sound signals that are received from multiple directions. It is understood that while FIG. 1 shows two microphones as an example, more than two may be used to receive sound signals.

The Fourier transformer 100 converts a time-domain signal, which is a sound signal received through the first and second microphones 1 and 2, into a frequency-domain signal. The Fourier transformer 100 may convert a time-domain signal into a frequency-domain signal by Discrete Fourier Transform (DFT) or Fast Fourier Transform (FFT). Moreover, the Fourier transformer 100 may frame time-domain signals and convert them into frequency-domain signals, frame by frame. Here, to obtain a stable spectrum, a framed sampling signal may be multiplied by a time window such as a hamming window. Framing units may be determined by a sampling frequency, a sort of application, and the like.

The noise power estimator 110 estimates a noise signal from the frequency-domain signal provided by the Fourier transformer 100. The noise estimation may be performed by various methods. For example, noise may be estimated by eliminating or preventing a sound signal coming from the direction of a source of target sound to be detected from a received sound signal, and then compensating for a change in directivity gain according to a frequency band of the sound signal from which the target sound is excluded or prevented.

As an illustration, the noise power estimator 110 may exclude only the target sound by calculating a difference between sound signals received through the two microphones 1 and 2, calculate a weight value based on an average of the sound signal excluding the target sound, and then estimate a noise component by multiplying the sound signal excluding the target sound by the weight value. However, it is understood that this is just one example and it will be evident to those skilled in the art that various other methods may be used.

The amplitude estimator 120 estimates the amplitude of the target sound according to a frequency band from a noise signal provided by the noise power estimator 110. An estimated amplitude according to a frequency band $\tilde{A}_k^j$ may be defined as an amplitude expected when a frequency-domain signal $Y_k^j$ and a phase difference according to a frequency band $\Delta\theta_k$ are observed, as shown in Equation 1:

$$\tilde{A}_k^j = E\lfloor A_k^j \mid Y_k^j, \Delta\theta_k \rfloor \quad \text{[Equation 1]}$$

Here, j denotes a channel and k is a frequency index.

Developing Equation 1 by hypothesizing that the frequency-domain signal includes the target sound and that it excludes the target sound, the estimated amplitude according to a frequency band $\tilde{A}_k^j$ may be expressed as shown in Equation 2:

$$\begin{aligned}\tilde{A}_k^j &= E[A_k^j \mid Y_k^j, \Delta\theta_k, H_k^1] \cdot P[H_k^j \mid Y_k^j, \Delta\theta_k] + \\ &\quad E[A_k^j \mid Y_k^j, \Delta\theta_k, H_k^0] \cdot P[H_k^0 \mid Y_k^j, \Delta\theta_k] \\ &= E[A_k^j \mid Y_k^j, \Delta\theta_k, H_k^1] \cdot P[H_k^j \mid Y_k^j, \Delta\theta_k] \\ &= Y_k^j F_a(k) F_p(k)\end{aligned} \quad \text{[Equation 2]}$$

In Equation 2, $E\lfloor A_k^j \mid Y_k^j, \Delta\theta_k, H_k^1 \rfloor = Y_k^j F_a(k)$ and $F_a$ is a transfer function of the amplitude estimator 120. Also, $P\lfloor H_k^j \mid Y_k^j, \Delta\theta_k \rfloor = F_p(k)$ and $F_a(k)$ is a phase filter transfer function of the phase filter 130 which will be described later.

The amplitude estimator 120 may estimate amplitude in various ways. For example, a Wiener filter may be used. The Wiener filter may be a filter that is optimized or designed to minimize an error between a desired output and a filter output with respect to a normal input that contains noise as well as a valid signal component.

As an example, amplitude estimation by the Wiener filter may be represented by Equation 3:

$$E[A_k^j \mid Y_k^j, \Delta\theta_k, H_k^1] = Y_k^j \cdot \frac{\zeta_k^j}{1+\zeta_k^j} = Y_k^j \cdot F_a(k) \quad \text{[Equation 3]}$$

The estimated amplitude $\tilde{A}_k^j$ is the product of the frequency-domain signal $Y_k^j$ and the transfer function $F_a(k)$, which may be given by Equation 4:

$$F_a(k) = \frac{\zeta_k^j}{1+\zeta_k^j} \quad \text{[Equation 4]}$$

Here, $\zeta_k^j$ is a signal-to-noise ratio (SNR), which may be given by Equation 5:

$$\zeta_k^j = \frac{|Y_k^j|^2 - \tilde{N}_k^2}{\tilde{N}_k^2} \quad \text{[Equation 5]}$$

The parameter $\tilde{N}_k^2$ denotes noise power estimated by the noise power estimator 110. This noise estimation by the noise power estimator 110 may be carried out in a variety of ways and is not restricted to the above method using the exemplary Wiener filter.

The phase filter 130 calculates a phase difference according to a frequency band from the amplitude-estimated frequency-domain signal, and eliminates or reduces noise based on the phase difference according to a frequency band. Here, a weight value according to a frequency band may be determined depending on whether the phase difference is within a permissible phase difference range of target sound. The permissible phase difference range of target sound may be established based on a frequency, the phase difference according to a frequency band, and a distance between the two microphones 1 and 2 that receive sound signals. The phase filter 130 will be further described with reference to FIG. 3.

The inverse Fourier transformer 140 transforms the noise-free or noise-reduced frequency-domain signal into a time-domain signal. For example, the time-domain signal may be generated by way of an overlapping and adding technique that proceeds by combining phase information of an input signal with an amplitude component of a processed signal, inverse Fourier transforming the combined result into the time domain, and adding and overlapping a window.

The noise preventing apparatus 10 may further include a divider (not shown). For example, the divider may divide the frequency-domain signal provided by the Fourier transformer 100 into frequency bands reflecting frequency domain characteristics or auditory recognition characteristics. Then, the divided frequency-domain signal may be applied to the functional blocks of the noise preventing apparatus 10, for example, the noise power estimator 110, the amplitude estimator 120, and the phase filter 130.

As an illustration, the divider may reflect frequency domain characteristics to enhance noise-filtering performance. For instance, in the frequency domain, a low frequency band may be finely analyzed while a high frequency band may be roughly analyzed. This technique may also be applied to an IS-127 noise filtering module of an Enhanced Variable Rate Codec (EVRC) voice coder (vocoder), and Aurora project's 2-stage Wiener filter, which may be used for extracting voice recognition parameters and is robust against noise.

The frequency bands may be arranged in, for example, Mel-scale bands or Bark-scale bands. That is, the divider may group DFT results in units of band, for example, the Mel band or the Bark scale, which reflect frequency domain characteristics or auditory recognition characteristics. Furthermore, the divider may process each group by applying the same value when calculating filtering factors of the noise power estimator 110, the amplitude estimator 120, and the phase filter 130.

Figure 2:
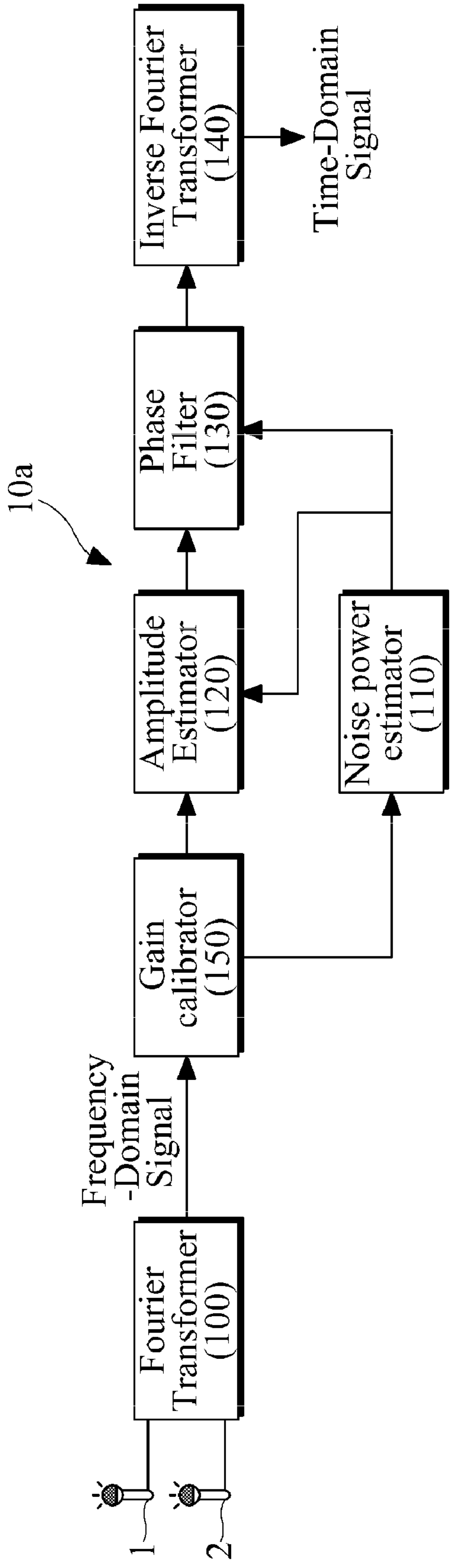
FIG. 2 is a block diagram of another exemplary noise preventing apparatus.

FIG. 2 illustrates another exemplary noise preventing apparatus 10*a*.

Referring to FIGS. 1 and 2, apparatus 10*a* of FIG. 2 may further include a gain calculator 150, for example, an automatic gain calibrator (AGC), between the Fourier transformer 100 and the amplitude estimator 120 of FIG. 1.

The gain calibrator 150 calibrates gains of adjacent microphones to which target sound is received. While FIG. 2 shows the two adjacent microphones 1 and 2, there is no restriction on the number of microphones.

Even though microphones are fabricated with the same specifications, there may be a difference between gains of the microphones, for example, because of a manufacturing error or line to line difference. Such a gain difference between the microphones makes it difficult to correctly exclude the target sound. Thus, gain calibration may be conducted before receiving sound signals through the microphones 1 and 2.

In one implementation, gain calibration may be performed once initially, and not intermittently or continuously. In another implementation, gain calibration may be performed intermittently to account for potential gain change due to environmental factors such as change in temperature and humidity. Gain calibration may be performed by various general methods. Meanwhile, the Fourier transformer 100, the noise power estimator 110, the amplitude estimator 120, the phase filter 130, and the inverse Fourier transformer 140 have been described with reference to FIG. 1, and thus will not be further described for conciseness.

Referring to FIGS. 1 and 2, the apparatuses 10 and 10*a* are configured to eliminate or prevent all noise excluding the target sound based on phase difference according to a frequency band of a sound signal. Since it is possible to eliminate or prevent noise from sound signals coming from all or multiple directions, regardless of the number of sound sources, it may not matter if there are more sound sources than microphones. Further, since noise can be eliminated or prevented from a received sound signal even where the adjacent microphones are very close to each other, the noise preventing apparatus may be applicable to a compact speech recognition system, a voice communication system, a compact mobile terminal, and the like.

Figure 3:
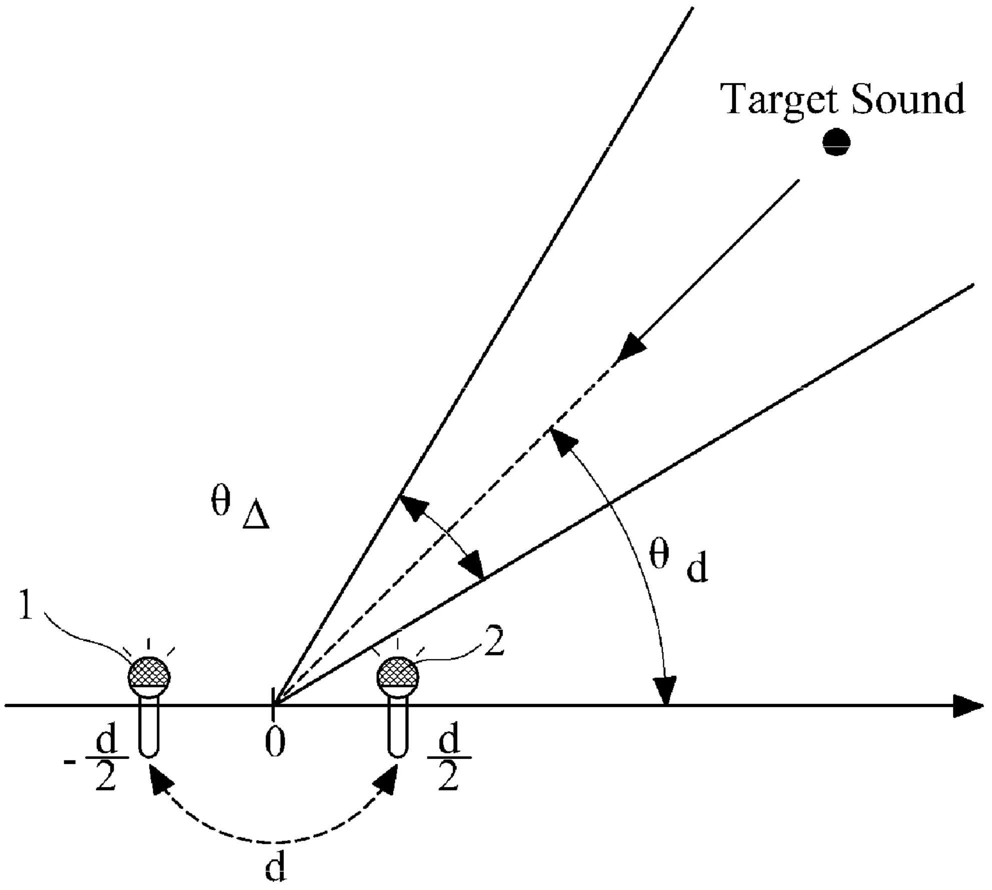
FIG. 3 is a reference diagram for explaining an exemplary process of preventing noise according to a permissible target sound phase difference range.

FIG. 3 is a reference diagram for explaining an exemplary process of eliminating or preventing noise according to a permissible target sound phase difference range, performed by the phase filter 130 shown in FIGS. 1 and 2, according to one implementation.

First, it is first assumed that the two adjacent microphones 1 and 2 are placed a distance d apart as shown in FIG. 3, a far-field condition is satisfied as the distance to a sound source is much greater than d, and a direction angle to the sound source is $\theta_d$. Then, a phase difference between first and second microphone signals x1(t,r) and $x_2$(t,r) received at a time t from the sound source at a distance r may be given by Equation 6:

$$\Delta P = \angle x_1(t,r) - \angle x_2(t,r) = \frac{2\pi}{\lambda} d\cos\theta_t = \frac{2\pi f}{c} d\cos\theta_t \quad \text{[Equation 6]}$$

Therefore, assuming that the direction angle $\theta_d$ of the sound source is the direction angle of the target sound, it is possible to predict a phase difference according to a frequency band from Equation 6 if the direction angle $\theta_d$ of the target sound is known. For a sound signal coming from a specific position with the direction angle $\theta_d$, the phase difference $\Delta P$ may vary according to a frequency band. The calculated phase difference $\Delta P$ according to a frequency band is used to attenuate noise signals other than the target sound.

In the meantime, considering the effects of noise and designating a permissible error in the direction of the target sound by $\theta_\Delta$, a phase filter $F_p(k)$ may be characterized by Equation 7:

$$P(H_k^1 \mid Y_k^j, \Delta\theta_k) = \left[1 + \frac{P(Y_k^j \mid H_k^0)}{P(Y_k^j \mid H_k^1)} \cdot \frac{(1 - P(H_k^1 \mid \Delta\theta_k))}{P(H_k^1 \mid \Delta\theta_k)}\right]^{-1} \quad \text{[Equation 7]}$$

In Equation 7, j denotes a channel and k is a frequency index.

Here, $$\frac{P(Y_k^j \mid H_k^0)}{P(Y_k^j \mid H_k^1)} = (\zeta_k^j + 1)\exp\left(-\frac{\zeta_k^j}{\zeta_k^j + 1} \cdot \gamma_k^j\right) \quad \text{[Equation 8]}$$

and $$\gamma_k^j = \frac{|Y_k^j|^2}{\tilde{N}_k^2}. \quad \text{[Equation 9]}$$

Noise can be eliminated or prevented by calculating a weight value with the phase difference according to a frequency band and multiplying the amplitude-estimated frequency-domain signal by the weight value. The weight value according to a frequency band is determined depending on whether it is included in the permissible target sound phase difference range. The permissible range may be defined by Equation 10:

$$P(H_k^1 \mid \Delta\theta_k) \cong \begin{cases} \alpha, & \varsigma_L(f) \leq \Delta P(f) \leq \varsigma_H(f) \\ 1 - \alpha, & \text{otherwise} \end{cases} \quad \text{[Equation 10]}$$

In Equation 10, $\Delta P(f)$ is a phase difference corresponding to a frequency of the input signal, $\zeta_L(f)$ is a lower critical value of the permissible target sound phase difference range, and $\zeta_H(f)$ is an upper critical value of the permissible target sound phase difference range. The phase filter $F_p(k)$ may be evaluated by putting Equation 7 into Equation 10.

Here, as an example, if $\theta_d+\theta_\Delta/2$ is smaller than $\pi/2$ and $\theta_d-\theta_\Delta/2$ is bigger than 0, the lower and upper critical values $\zeta_L(f)$ and $\zeta_H(f)$ may be summarized in Equations 11 and 12:

$$\varsigma_l(f) = \frac{2\pi f}{c} d\cos(\cos\theta_d + \theta_\Delta/2) \quad \text{[Equation 11]}$$

$$\varsigma_H(f) = \frac{2\pi f}{c} d\cos(\cos\theta_d - \theta_\Delta/2) \quad \text{[Equation12]}$$

In Equations 11 and 12, c is the speed of sound (330 m/s) and ff denotes a frequency. In Equations 11 and 12, c is the speed of sound (330 m/s) and f denotes a frequency. In another example, if $\theta_d$ is $\pi/2$, $\zeta_L(f)$ is zero.

As can be seen from Equations 11 and 12, the permissible target sound phase difference range may be determined by the frequency f, the direction angle $\theta_d$, the permissible error $\theta_\Delta$ in the direction of the target sound, and the distance d between the two microphones 1 and 2 receiving the sound signal. Accordingly, it is possible to eliminate or prevent noise even though the two microphones are closer to each other. For example, even if the two microphones 1 and 2 are spaced about 10 mm apart, noise can be eliminated or prevented from a sound signal applied to them. Accordingly, the noise preventing apparatus 10 or 10*a* may be applicable to, for example, a compact speech recognition system or a voice communication system.

Considering a relation between a permissible target sound angle range and the permissible target sound phase difference range, it may be determined that the target sound exists when the phase difference $\Delta P(f)$ at a predetermined frequency of the currently input sound signal is included in the permissible target sound phase difference range, and that no target sound exists when the phase difference $\Delta P(f)$ at a predetermined frequency of the currently input sound signal is not included in the permissible target sound phase difference range.

Figure 4:
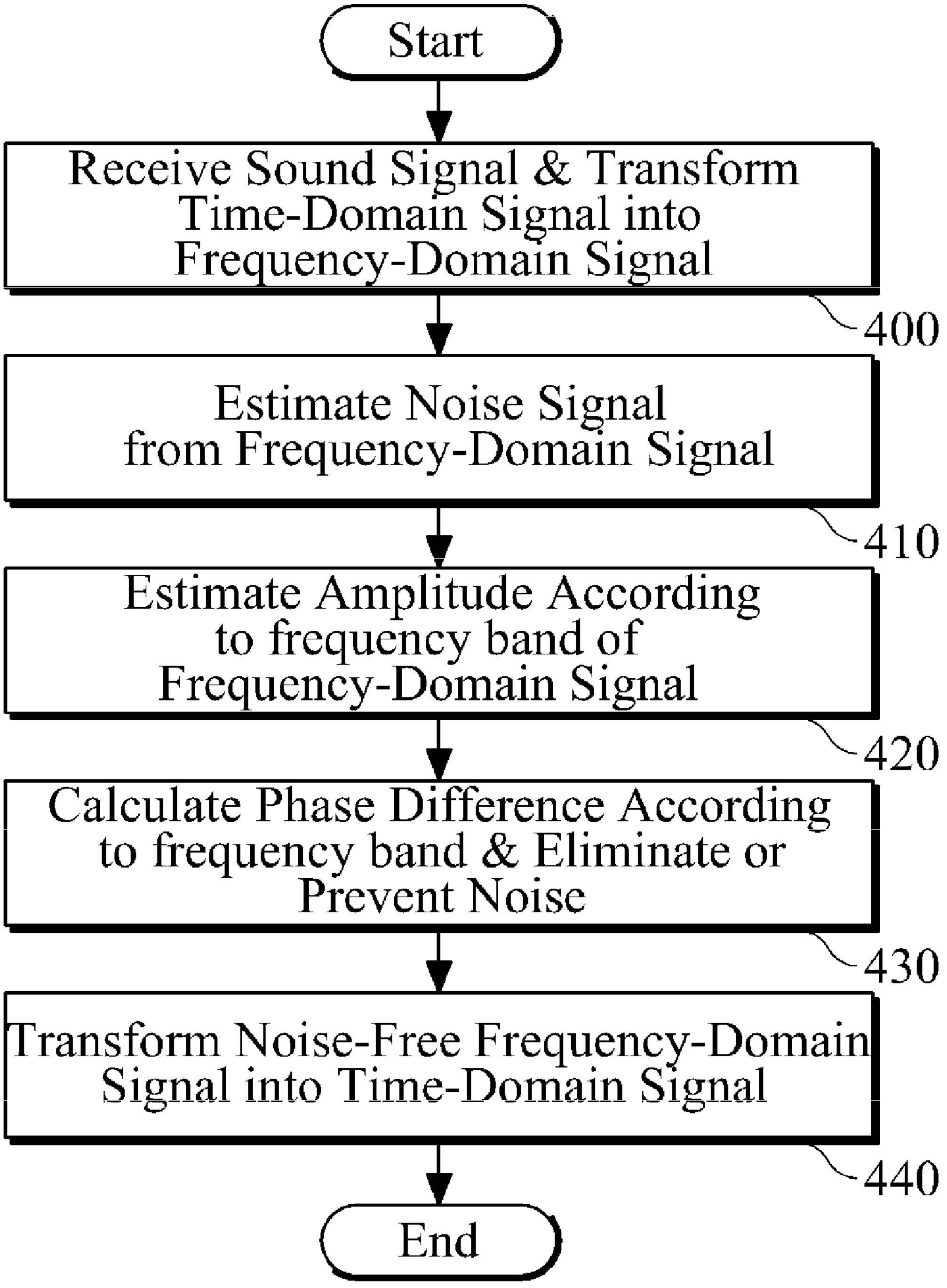
FIG. 4 is a flowchart illustrating an exemplary process of preventing noise.

FIG. 4 is a flowchart of an exemplary process of eliminating or preventing noise. The process may be performed by, for example, the apparatus 10 of FIG. 1.

In operation 400, sound signals are received from all or multiple directions and a time-domain signal is transformed into a frequency-domain signal. Here, the sound signals may be received through two adjacent microphones.

In operation 410, a noise signal is estimated from the transformed frequency-domain signal. For instance, a weight value may be calculated based on an average of sound signals from which the target sound is excluded, and multiplied with an audio signal from which the target sound is excluded to estimate the noise signal.

In operation 420, the estimated noise signal is used to estimate the amplitude of the frequency-domain signal. For instance, the amplitude estimation may be accomplished using a Wiener filter as described with reference to FIG. 1.

In operation 430, a phase difference according to a frequency band is calculated from the amplitude-estimated frequency-domain signal, and noise is eliminated or prevented based on the calculated phase difference according to a frequency band. Here, the phase difference according to a frequency band may be used to calculate a weight value according to a frequency band which is multiplied with the amplitude-estimated frequency-domain signal to eliminate or prevent noise. The weight value according to a frequency band may be determined depending on whether the phase difference is included in the permissible target sound phase difference range. The permissible target sound phase difference range may be defined by a frequency, the phase difference according to a frequency band, and a distance between the adjacent microphones receiving the sound signals.

In operation 440, the noise-free frequency-domain signal is transformed into a time-domain signal.

While not shown in FIG. 4, the process may further include calibrating gains of the adjacent microphones for the frequency-domain signal.

Moreover, the process may also include dividing the transformed frequency-domain signal into frequency bands reflecting frequency domain characteristics or auditory recognition characteristics. Here, the divided frequency-domain signals may be applied to estimating noise, estimating amplitude, and eliminating or preventing the noise, so that the same value can be used in evaluating filter coefficients.

According to example(s) described above, noise may be effectively eliminated or reduced from received sound signals, even in a small or compact system having microphones arranged close to each other.

According to example(s) described above, an apparatus and method may be provided to eliminate or prevent noise from a sound signal excluding the target sound thereof, in accordance with frequency, phase difference according to a frequency band, and distance between microphones. As noise can be filtered even when, for example, adjacent microphones are separated by a very small interval, the apparatus is applicable to a compact mobile terminal having a speech recognition system or a voice communication system. Moreover, since noise can be eliminated or prevented from sound signals coming from all or multiple directions, regardless of the number of sound sources, it may matter less if there are more sound sources than microphones.

The methods described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A noise preventing apparatus comprising: a noise power estimator to estimate a noise signal from a sound signal transformed into a frequency-domain signal; an amplitude estimator to estimate an amplitude of the frequency-domain signal according to a frequency band using the estimated noise signal; and a phase filter to calculate a phase difference according to a frequency band from the amplitude-estimated frequency-domain signal and eliminate or prevent noise based on the phase difference according to the frequency band, wherein the phase difference is between two microphone signals corresponding to microphones which receive the sound signal.

2. The apparatus of claim 1, further comprising:

a Fourier transformer to receive the sound signal from multiple directions and transform the sound signal into the frequency-domain signal; and an inverse Fourier transformer to transform the frequency-domain signal from which the noise has been eliminated or prevented by the phase filter into a time-domain signal.

3. The apparatus of claim 2, wherein the sound signal is received through at least two adjacent microphones.

4. The apparatus of claim 1, wherein the phase filter eliminates or prevents the noise by calculating a weight value based on the phase difference according to the frequency band and multiplying the amplitude-estimated frequency-domain signal by the weight value.

5. The apparatus of claim 4, wherein the weight value according to the frequency band is determined depending on whether the phase difference is within a permissible phase difference range of target sound.

6. The apparatus of claim 5, wherein the permissible phase difference range of the target sound is determined by the frequency band, the phase difference according to the frequency band, and a distance between adjacent microphones receiving the sound signal.

7. The apparatus of claim 1, wherein the amplitude estimator estimates the amplitude of the frequency-domain signal according to the frequency band using a Wiener filter that uses a signal-to-noise ratio of the frequency-domain signal to the estimated noise signal.

8. The apparatus of claim 1, wherein the noise power estimator estimates the noise by eliminating or preventing an input signal coming from a direction of a sound source of target sound to be detected from the frequency-domain signal and then compensating for a change in directional gain according to a frequency band of the frequency-domain signal from which the target sound is blocked.

9. The apparatus of claim 2, further comprising a gain calibrator to equalize gains of adjacent microphones receiving the sound signal.

10. The apparatus of claim 1, further comprising a divider to divide the frequency-domain signal into frequency bands reflecting frequency domain characteristics or auditory recognition characteristics, and apply the divided frequency-domain signals to the noise power estimator, the amplitude estimator, and the phase filter.

11. The apparatus of claim 10, wherein the frequency bands are Mel-scale bands or Bark-scale bands.

12. The apparatus of claim 1, wherein the calculated phase difference comprises the phase difference between two sound signals received by adjacent microphones, respectively.

13. A method for preventing noise, the method comprising: receiving a sound signal and transforming the sound signal into a frequency-domain signal; estimating a noise signal from the frequency-domain signal; estimating an amplitude of the frequency-domain signal according to a frequency band using the estimated noise signal; calculating a phase difference according to a frequency band from the amplitude-estimated frequency-domain signal and eliminating or preventing noise based on the phase difference according to the frequency band; and transforming the frequency-domain signal from which the noise has been eliminated or prevented into a time-domain signal, wherein the phase difference is between two microphone signals corresponding to microphones which receive the sound signal.

14. The method of claim 13, wherein the receiving of the sound signal comprises receiving the sound signal from multiple directions through at least two adjacent microphones.

15. The method of claim 13, wherein the eliminating or preventing of the noise comprises calculating a weight value based on the phase difference according to the frequency band, and multiplying the amplitude-estimated frequency-domain signal by the weight value.

16. The method of claim 15, wherein the weight value according to the frequency band is determined depending on whether the phase difference is within a permissible phase difference range of target sound, the permissible target sound phase difference range depending on the frequency band, the phase difference according to the frequency band, and a distance between adjacent microphones receiving the sound signal.

17. The method of claim 13, wherein the estimating of the amplitude comprises estimating the amplitude using a Wiener filter that uses a signal-to-noise ratio of the frequency-domain signal to the estimated noise signal.

18. The method of claim 13, further comprising calibrating gains of adjacent microphones receiving the sound signal.

19. The method of claim 13, further comprising:

dividing the frequency-domain signal into a plurality of frequency bands reflecting frequency domain characteristics or auditory recognition characteristics; and applying the divided frequency-domain signals to the estimating of the noise, the estimating of the amplitude, and the estimating of the noise.

* * * * *